United States Patent
Rostoker

[15] 3,692,919
[45] Sept. 19, 1972

[54] VIBRATION DAMPING DEVICE FOR TRANSMISSION LINES

[72] Inventor: Louis Rostoker, Toronto, Ontario, Canada

[73] Assignee: Pep Professional and Engineered Patents Limited

[22] Filed: July 8, 1971

[21] Appl. No.: 160,789

[52] U.S. Cl. .................................. 174/42, 188/1 B
[51] Int. Cl. ............................................. H02g 7/14
[58] Field of Search ..................... 174/42; 188/1 B

[56] References Cited

UNITED STATES PATENTS

| 2,745,896 | 5/1956 | Rostoker | 174/42 |
| 3,300,575 | 1/1967 | Short | 174/144 |

FOREIGN PATENTS OR APPLICATIONS

| 498,559 | 12/1953 | Canada | 174/42 |
| 969,475 | 6/1958 | Germany | 174/42 |
| 403,901 | 6/1966 | Switzerland | 174/146 |

Primary Examiner—Laramie E. Askin
Attorney—Cavanagh & Norman

[57] ABSTRACT

The following disclosure concerns a vibration damping device for transmission lines which embodies a combination of upstanding suppressor heads and a base adapted to be clamped to the transmission lines or cable for the suppression of galloping wave type vibrations with a suspended suppressor head of similar construction and adapted to suppress high frequency aeolian vibrations, the galloping wave suppressor heads being adapted to rock on pivotal mountings and the high frequency suspended suppressor head being fixed relative to the clamping base.

7 Claims, 3 Drawing Figures

PATENTED SEP 19 1972
3,692,919
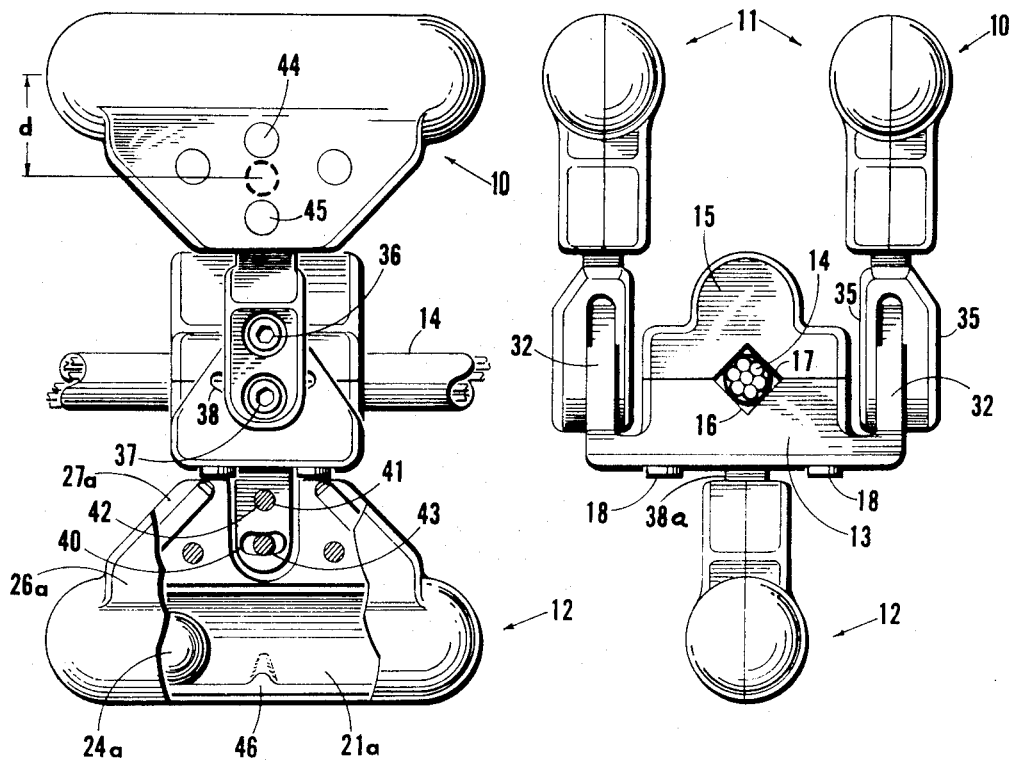
FIG 1
FIG 2
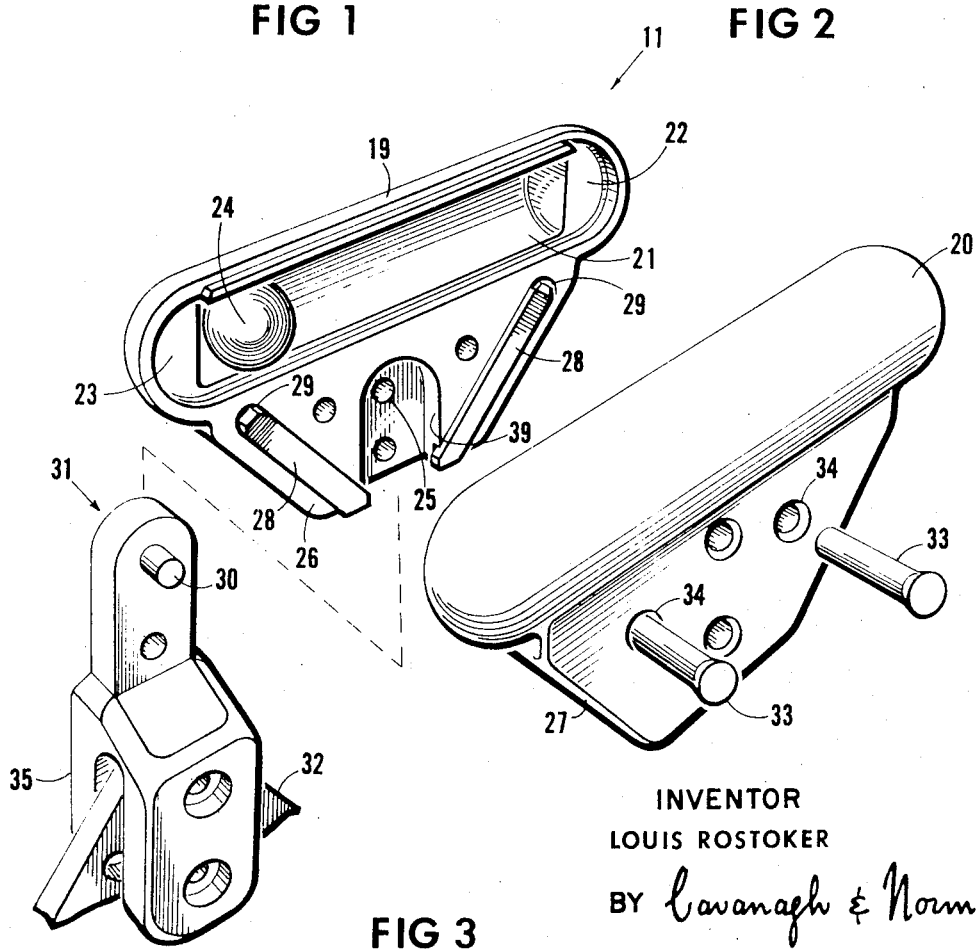
FIG 3
INVENTOR
LOUIS ROSTOKER
BY Cavanagh & Norman

VIBRATION DAMPING DEVICE FOR TRANSMISSION LINES

This invention relates to a vibration damping device for use in damping vibrations in electrical transmission lines extending between transmission towers.

In my prior U.S. Pat. No. 2,745,896, issued May 15, 1956, there was disclosed a single frequency vibration damping device of elementary form which could be applied to transmission lines to dampen a different frequency at each successive transmission line span. It was thought necessary in the device of my prior patent to provide a levelling spring device to assist in setting up the damping device in the first instance so that it would proceed in its function from an initial level position. All types of vibration damping devices exhibit a collection point for corona on a transmission line which condition is to be avoided to reduce losses.

Whereas the vibration of a galloping conductor is of an amplitude of between one quarter and three eights of an inch or more and the frequency of the travelling wave is of the order of fourteen to twenty cycles per second, so-called high frequency aeolian waves or vibrations encountered normally in the form of standing waves of an amplitude of about up to one eighth of an inch derive mainly from spurious disturbances and are of a frequency above twenty cycles per second to as high as seventy cycles per second or more.

It is a main object of the invention to provide a vibration damping device of duplex form adapted simultaneously to dampen different frequencies.

It is another object of the invention to provide a vibration damper of simplified, sturdy construction adapted to minimize corona effect.

It is a further object of the invention to provide a vibration damping device which is devoid of springs.

It is a still further object of the invention to provide a vibration damping device for the damping of travelling waves of aeolian vibrations in a transmission line.

In the drawings:

FIG. 1 is a side elevation of my improved vibration damper device attached to a transmission line.

FIG. 2 is an end elevation of the damper of FIG. 1.

FIG. 3 is an exploded perspective view of damper head components of FIG. 1 associated with a mounting post.

In the drawings the duplex transmission line vibration damping device 10 of the invention comprises upper galloping wave rocker-type suppressor heads 11 and a suspended fixed aeolian vibration suppressor head 12 extending from clamp base 13 fixed to cable 14 by clamping bar 15 and aligned thereon by base groove 16 and bar groove 17, the base and clamping bar being fastened by screw bolts 18. The upper galloping wave rocking-type suppressor heads 11 are formed in the manner shown in FIG. 3 and comprise the two cast half parts 19, 20 describing when assembled a hollow bore 21 terminating at its ends at anvil members 22, 23 against which steel ball 24 bounces as the suppressor head 11 rocks on pivot sockets 25 in depending flanges 26, 27, which flanges are brought together in the assembly of the halves 19 and 20 in accurate relationship by means of the steel inserts 28 in sockets 29 of such flanges.

Flange pivotal sockets 25 seat about the stud pivot shafts 30 on mounting post 31 rising upwardly from each upstanding bracket arm 32 rising upwardly from the clamping base 13. The two suppressor head halves are fastened together by rivets 33 through holes 34 in flanges 26, 27. Each mounting post 31 extending upwardly from its upper tongue 32 carrying said stud pivots 30 defines the bifurcated mounting arms 35 extending about upstanding bracket arms 32 and fastened thereto by a pivot screw 36 clamped in a desired horizontal position by the clamping screw 37 extending through the arcuate slot 38 of upstanding bracket arm 32. Accordingly the upper galloping conductor suppressor heads 11 may be levelled relative to the horizontal when supported on a portion of a suspended cable 14 at a slight slope to the horizontal.

The suspended high frequency or aeolian vibration suppressor head 12 is formed in a manner similar to the formation of the suppressor heads 11 but is fixedly mounted relative to the base clamp 13. A downwardly projecting central mounting arm 38a extending downwardly from clamping base 13 is adapted to be received within a suppressor head flange mounting recess 39 and embodies a lower arcuate slot 40 and an upper bore 41 adapted to accommodate suppressor head mounting bolts or rivets 42, 43 passing through fixed mounting holes 44, 45 of suppressor flanges 26a and 27a. Preferably bore 21a of the high frequency suppressor head 12 embodies midway a partial transverse bead 46 adapted to vary the frequency of back and forth reciprocation or oscillation of ball 24a in a somewhat random manner though adapted to permit free passage of said ball so that such bore in the high frequency suppressor head may be regarded as having an intermediate restriction.

It is preferred that the suppressor components be similar, that is of the same size, and obtainable from the same casting moulds but that the restriction 46 in the high frequency suppressor head 12 be cast in place as a slight modification of the casting process by the use of an insert portion of a male mould or die part. The components of the invention are readily adapted in the form of the suppressor head half parts and in the form of the mounting bracket and clamp to be formed of cast aluminum or other non-ferrous alloy. The contours and outer surfaces of the suppressor heads are rounded and smooth to avoid sudden exposed changes of contour. Especially the half parts may be made of glass fiber reinforced plastic material in which the anvil parts 22, 23 are cast in place as metal inserts of cast iron, steel or aluminum. The steel balls 24, 24a are preferably of one hundred grams weight and approximately of one and one eighth of an inch diameter hardened steel.

The diameter of bores 21, 21a should be about 1.25 times the diameter of the ball and the length of such bore between the anvils 22, 23 should be of the order of 4.5 times the diameter of the ball. The pivot distance 'd' between the pivoted axis and the axis on bore 21 may be of the order of one and one half times the diameter of the ball and such axis spaced a distance of two and one half times the diameter of the ball from the axis of the cable 14. The fixed high frequency suppressor head 12 may have the axis of its bore 21a located at the same distance from the axis of the cable 14 or closer as indicated in FIGS. 1 and 2, but generally it is desirable to have the high and low frequency suppressor heads in upstanding and suspended position as indicated substantially the same distance from the cable with respect to which they are supported vertically in parallel relationship to the cable.

I claim as my invention:

1. A vibration damping device for tensioned electrical transmission cable and comprising: a clamping base having a clamping groove seatable on said cable for fixture of said base thereon; spaced apart upstanding bracket arms on said base and a lower mounting arm extending downwardly from said base; three suppressor heads each having a longitudinal bore terminating at its ends in anvil members and a ball in said bore freely moveable between said anvil members in said bore; a mounting post adjustably mounted on each upstanding bracket arm; means pivotally connecting each mounting post to a suppressor head to align the bore thereof in substantially parallel spaced apart relation to the clamping groove of said base, said pivotally mounted suppressor heads being free to rock on a mounting post responsive to galloping wave vibrations in said cable; and a corresponding suppressor head suspended from said downwardly projecting mounting arm and immovably fixed thereto substantially parallel to said clamping groove for suppression of higher frequency aeolian vibrations in a cable to which said base is to be clamped.

2. The device of claim 1 in which the bore of each suppressor head is defined by two cast half parts each having a depending flange and having smooth exterior surfaces.

3. The device of claim 1 in which the bore of each suppressor head is defined by two cast half parts each having a depending flange and having smooth exterior surfaces, the material of said cast half parts being a glass fiber reinforced plastic material, said anvil members and said ball being formed of metal.

4. The device of claim 1 in which the bore of each suppressor head is of the same effective length and the ball therein of the same weight.

5. The device of claim 1 and an intermediate restriction in the bore of said suspended suppressor head.

6. A vibration damping device for tensioned electrical transmission cable and comprising: a base having a clamping groove for clamping said device to said cable; upstanding rocket type suppressor heads pivotally mounted on said base and aligned substantially parallel to said groove for rocking motion responsive to galloping wave vibrations to suppress the latter; and a suspended suppressor head below said base and immovably fixed thereto in substantially parallel spaced relation to said clamping groove and being of a construction similar to the construction of said first-mentioned suppressor heads and being adapted by virtue of its fixture relative to said base to suppress higher frequency aeolian vibrations in a cable to which said base is to be clamped.

7. The device of claim 6 in which the suppressor heads are similar in construction and size and of a form having a ball of predetermined weight reciprocable in a bore substantially parallel to the groove of said base, the length of each bore being of the order of four and one half times the diameter of the ball, the distance of each bore longitudinal axis from the groove being of the order of four times the diameter of the ball, and the pivotal axis of rocking motion of the rocker type suppressor heads being about one and one half times the diameter of the ball from said axis.

* * * * *